Figure 3:
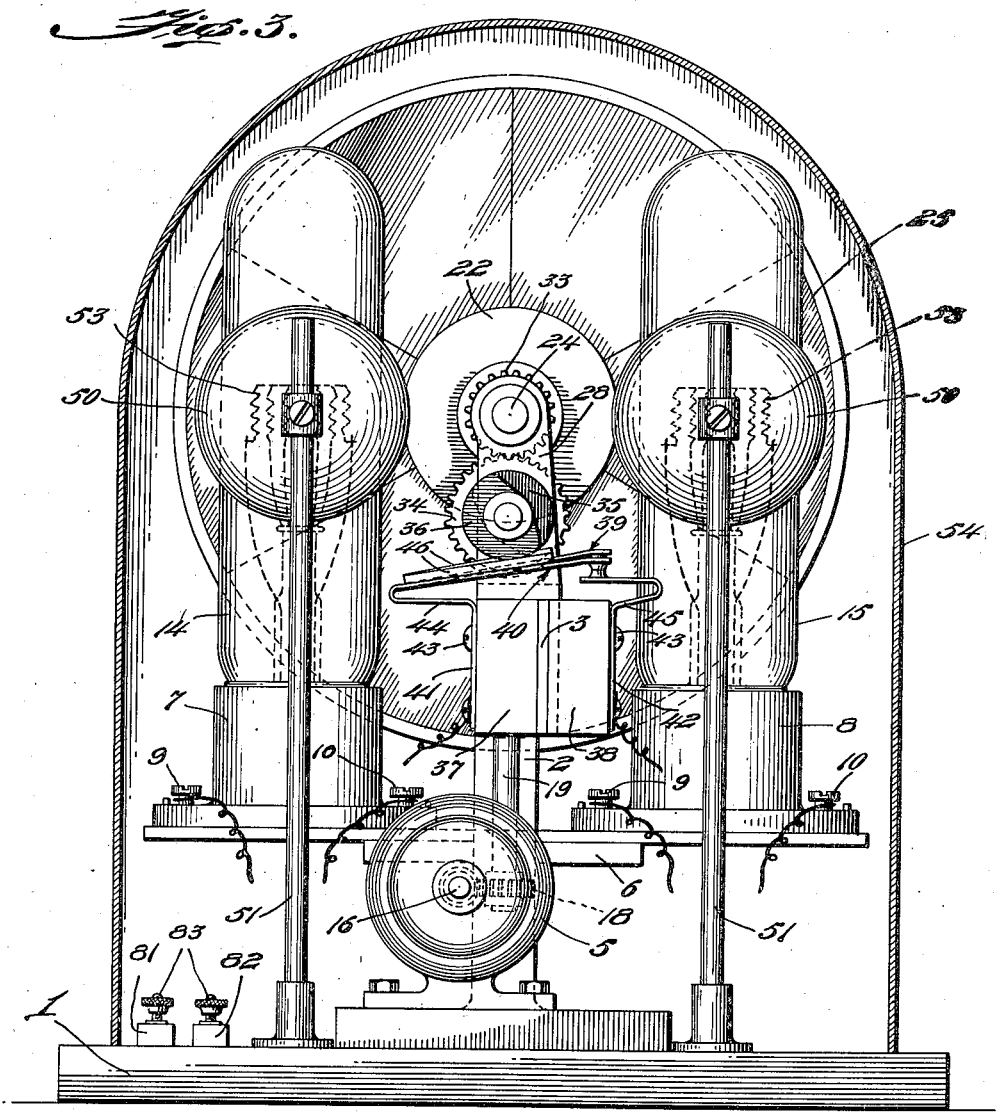

May 24, 1938.   E. NANFELDT   2,118,264
LIGHT PROJECTION DISPLAY MEANS
Filed July 12, 1934   3 Sheets-Sheet 1
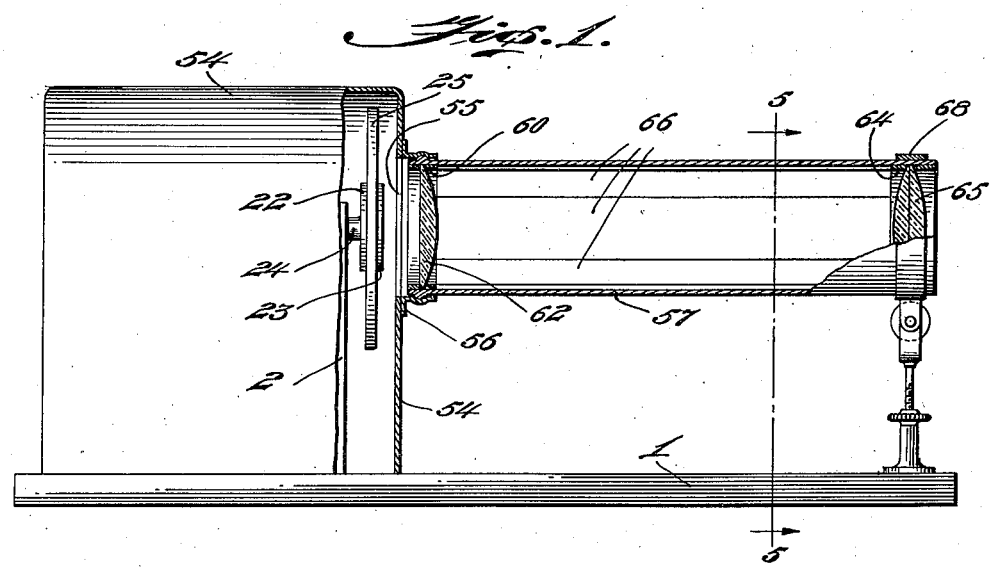
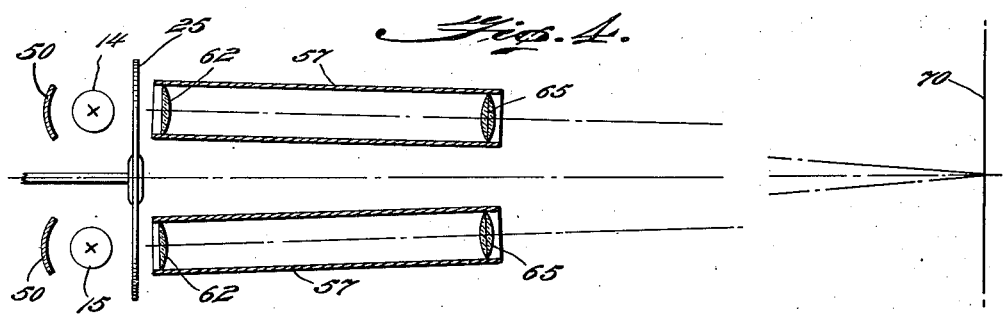
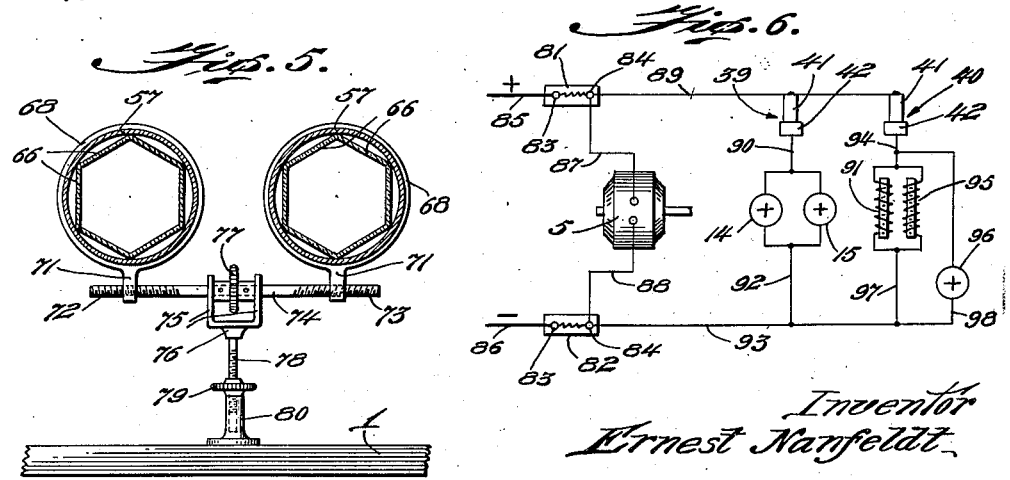
Inventor
Ernest Nanfeldt
By Perley H. Plant
Attorney

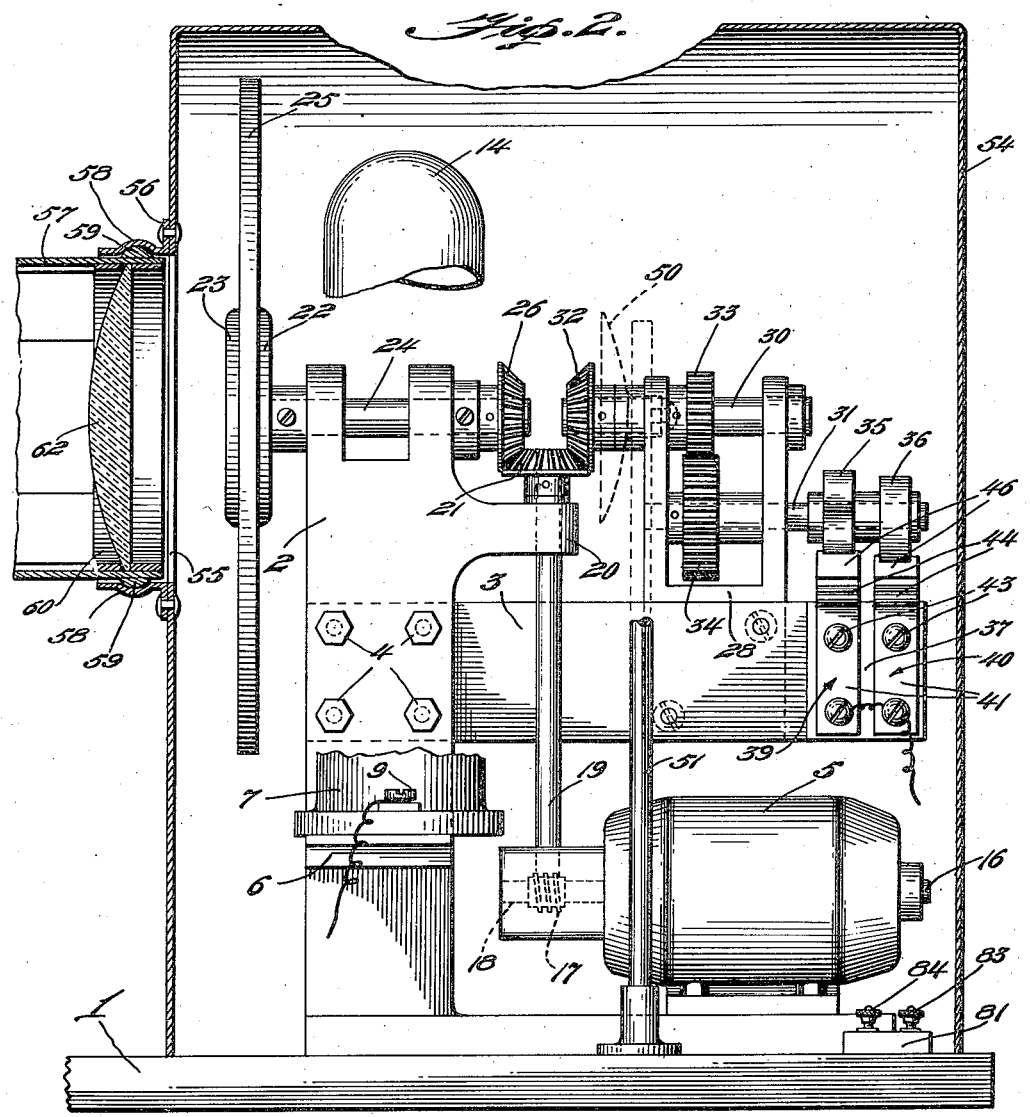
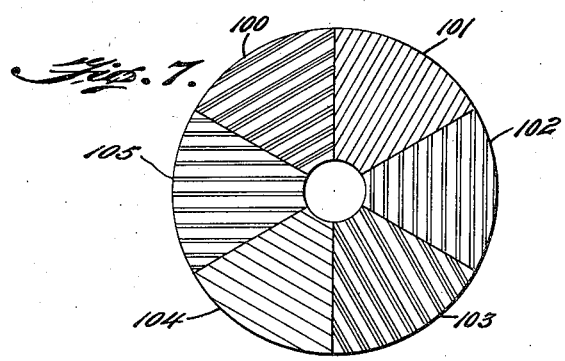

May 24, 1938.   E. NANFELDT   2,118,264

LIGHT PROJECTION DISPLAY MEANS

Filed July 12, 1934   3 Sheets-Sheet 3

Inventor
Ernest Nanfeldt
By Perley H. Plant
Attorney

Patented May 24, 1938

2,118,264

UNITED STATES PATENT OFFICE 2,118,264

LIGHT PROJECTION DISPLAY MEANS

Ernest Nanfeldt, New Haven, Conn., assignor to Respro, Inc., Cranston, R. I., a corporation of Rhode Island Application July 12, 1934, Serial No. 734,727

4 Claims. (Cl. 272—10)

This invention relates to the art of light projection display, such as, in the projection of novel effects in light or color upon a screen or other receiving surface to provide novel and changeable light and/or color effects for the purpose of entertainment, advertising or the like involving the use of novel means and combinations of means for effecting the display.

One object of the invention is the provision of means producing superposed light or color and image effects simultaneously whereby each effect is modified by the other to obtain a composite display of a novel and pleasing character.

Another object of the invention is the provision of means for modifying color and image effects before their projection upon the receiving surface.

Another object of the invention is the provision of a color or image or combined color and image forming means having corresponding portions arranged in position for the substantially simultaneous passage of projected light rays to form a display, and having similar but contrasting portions arranged for the substantially simultaneous passage of projecting light rays to produce two or more varying displays alternately or in sequence.

A further object of the invention is the provision of a plurality of light reflecting surfaces located substantially parallel with the projected light rays to further modify and produce changeable variations in the display.

Another object of the invention is the provision of a novel combination of operating means including mechanism whereby novel light effects may be produced upon a receiving surface in a predetermined order or the display effects alternated with others to vary or modify the display.

A further object of the invention is the provision of means for projecting dissimilar but correlated images of a changing character from different light sources upon a receiving surface simultaneously to produce a combined color and/or image effect.

Another object of the invention is the provision of spaced light sources with means for passing reflected light from each light source through a common light modifying member formed of sections, in such a manner that corresponding sections may modify the reflected light rays simultaneously, and projecting the modified light rays from different sections upon a light receiving surface simultaneously.

A further object of the invention is the provision of a movable light modifying member provided with different light modifying sections adapted to be traversed by reflected light rays from different light sources simultaneously and means operable from the movement of the light modifying member for lighting or extinguishing one or another of said light sources in accordance with a prearranged plan of operation.

Other objects and advantages of the invention relate to various novel parts and arrangements and combinations of parts as well as new and improved methods of combining and operating the same as will be more fully set forth in the detailed description to follow.

Referring to the drawings:—

Figure 8:
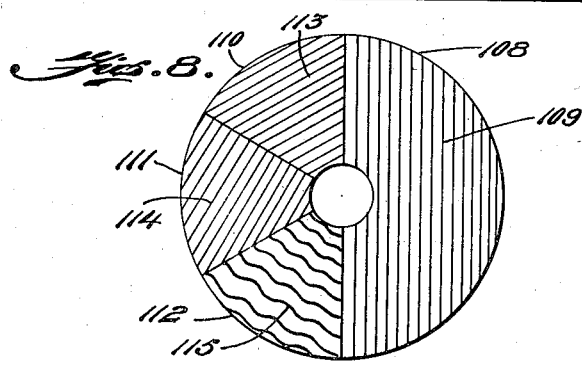

Fig. 1 is a side elevational view of the light projection display means showing one of the projection tubes in partial section and with a portion of the main casing broken away, Fig. 2 is a sectional view through the main portion of the casing showing the operating parts in side elevation, and illustrating the manner of connecting one of the projection tubes with the casing, Fig. 3 is a transverse sectional view through the casing showing the operating parts in rear elevation, Fig. 4 is a diagrammatic top plan view illustrating the relative positions of the light sources, reflector members, light transmitting member and projection tubes with respect to each other and a light receiving surface, Fig. 5 is a transverse sectional view through a portion of the light projection tubes, taken substantially along the line 5—5 of Fig. 1, and showing the tube adjusting means in elevation, Fig. 6 is a diagrammatic view of one arrangement of electric circuits such as may be employed in connecting the motor, filamentary lamps, auxiliary light and control means, and the operating means therefor with a source of electric power, Fig. 7 is a plan view of one form of light transmitting member such as may be employed in connection with the light display projection means, and, Fig. 8 is a plan view of a modified form of light transmitting member.

In the form of the invention illustrated herein, I designates a supporting base which may support such operating parts as the motor, sources of light, light transmitting means, reflector members and the operating parts generally through any suitable or desired arrangement of means for maintaining these parts in proper operative relation with each other.

In the present instance, a suitable upright supporting frame member 2 is carried by the base 1 and provided with a horizontally extending arm 3, which may be formed integral with the frame 2 or secured thereto in any desired manner. A motor 5 of suitable character and design is also carried by the base 1 for actuating certain of the operating mechanisms such as may be supported by the upright frame 2.

The supporting frame 2 may be provided with laterally extending shelves 6 for supporting lamp sockets 7 and 8, each of which is provided with suitable terminal connections 9 and 10, and in which may be mounted any suitable light emitting means, such as filamentary lamps 14 and 15 respectively. The lamps may be of any ordinary or special character such as are adapted for use in the emission of light rays of the desired intensity.

The motor 5 is provided with a shaft 16, carrying a worm pinion 17 meshing with a spiral gear 18 carried by a vertical shaft 19, which is in turn rotatably supported by a bearing 20 carried by the frame 2 and is provided with a beveled gear 21 for driving certain operating mechanisms supported by the upright frame 2. The main portion of the upright frame 2 is provided with aligned bearings for rotatably supporting a shaft 24 which has a suitable light transmission member 25 secured thereto, as by collars 22 and 23, and carries a beveled gear 26 mounted for meshing engagement with the beveled gear 21 carried by the shaft 19.

A suitable frame 28 may be formed integral with or secured to the horizontal arm 3 by any suitable means, the frame 28 being provided with aligned bearings for rotatably supporting shafts 30 and 31. The shaft 30 is provided with a beveled gear 32 secured thereto and mounted for meshing engagement with the beveled gear 21 carried by the vertical shaft 19. A second gear 33 is fixed to the shaft 30 and operatively engages a gear 34 secured to the shaft 31. The shaft 31 extends materially beyond the frame 28 and carries cams 35 and 36 secured thereto for rotation therewith. Blocks 37 and 38 of any suitable insulating material, such as rubber, Bakelite, or the like, are carried by the horizontal arm 3 and spaced from the frame 28. Current interrupters 39 and 40 are carried by the blocks 37 and 38 and located in operative relation with the cams 35 and 36 respectively.

Each of the current interrupters 39 and 40 may be formed of two parts 41 and 42, each part having a portion adapted for attachment to one of the insulating blocks 37 or 38, as by screws 43. Each of the parts 41 and 42 is provided with a resilient contact carrying portion 44 and 45 respectively, of which the portion 44 may be provided with an insulating plate 46 mounted for operative engagement by one of the cams 35 or 36.

A reflector member 50 of any desired construction and design may be adjustably mounted upon a standard 51 carried by the base 1, and suitably located relative to the luminous portion or filament 53 of each lamp for reflecting light rays of maximum intensity through portions of the light transmitting member 25.

A casing 54 is provided for enclosing the operating parts of the mechanism and supported in any suitable manner from the base 1. The casing 54 may be provided with spaced openings 55 formed therein and located upon opposite sides of the vertical plane of the shaft 24, each opening being located substantially within the path of light rays as reflected from one light source by the reflector member 50.

Any suitable means, such as a collar 56, may be secured to or carried by the casing 54 for mounting one end of a projection tube 57 in substantial axial alignment with each opening 55 formed in the casing, or in such operative relation with the opening as will result in the passage of the major portion of the reflected light rays passed through the light transmission member 25 from one light source through one of the light projection tubes 57. Each collar 56 and projection tube 57 may be provided with suitable means for supporting the end of a light projection tube 57 so as to permit a certain degree of adjustment of the outer ends of the projection tubes 57, whereby the projected light rays from the tubes may be brought into superposed relation and into the desired position upon a light receiving surface. Such supporting means may comprise a curved recess 58 formed in the collar for receiving a rounded rib 59 carried by the end of the projection tube, as shown in Fig. 2 of the drawings.

Each light projection tube 57 may be provided at the end adjacent to the casing 54 with an internal collar 60 or other suitable means for supporting a condensing lens 62, which may be planoconvex, as shown in Figs. 1 and 4 of the drawings. A similar internal collar 64 located adjacent to the outer end of each light projection tube 57 is adapted to support a magnifying lens 65, as shown in Figs. 1 and 4, of the drawings. Each projection tube may be provided with a plurality of plane mirrors 66, located within the tube and extending longitudinally thereof, and which may be held in position therein by the internal collars 60 and 64. In the present case each tube is provided with six plane mirrors of substantially equal widths, after the manner shown, to form a substantially hexagonal light passage extending therethrough although a greater or less number may be employed as desired.

An external collar 68 may be provided for each light projection tube 57 and firmly secured thereto adjacent to the outer end thereof to provide means for adjustably supporting the outer ends of the tubes 57 in various positions towards or from each other so that the reflected light rays from the light sources 14 and 15 may be thrown into superposed relation upon a light receiving surface 70. Each collar 68 is provided with an internally threaded lug 71, the lugs being adapted to receive reversely threaded end portions 72 and 73 of an adjusting bar 74 which may be rotatably supported by the arms 75 of a vertically adjustable supporting member 76. The adjusting bar 74, as shown, is provided with an angular portion 77 for adjusting the outer ends of the projection tubes towards and from each other. The supporting member 76 is provided with an externally threaded portion 78, adapted to be threaded within an adjusting nut 79 carried by a post 80 for securing the desired vertical adjustment of the outer ends of the projection tubes.

The operation of the motor 5, as well as the provision of means for effecting continued or intermittent illumination by the light sources 14 and 15 may be effected from any suitable electric current source by means of a system of wiring similar to that shown in Fig. 6 of the drawings wherein terminal supporting blocks 81 and 82 may be carried by the base 1 and each provided with electrically connected binding posts 83 and 84 for connection respectively with line conductors 85 and 86 and conductors completing circuits through the motor 5, lamps 14 and 15 and other electrically operated devices. Conductor wires 87 and 88 connect the binding posts 84 with the terminals of the electric motor 5, while a conductor wire 89 connects the binding post 84 of the block 81 with the parts 41 of each interrupter. A conductor 90 connects the part 42 of the interrupter 39 with one terminal each of the lamps 14 and 15, while a conductor 92 connects the other terminals of the lamps 14 and 15 with a conductor 93 which connects with the terminal 84 carried by the block 82. A branched conductor 94 connects the part 42 of the interrupter 40 with one terminal each of solenoids 91 and 95 and a lamp 96, which are in turn connected to the conductor 93 by conductor wires 97 and 98.

The solenoids 91 and 95 and lamp 96, operated through the interrupter 40, may constitute part of an auxiliary light projection mechanism, such for example, as may be adapted for use in connection with the present structure, as in the following manner;—for operating the display mechanism and displaying one or more films or light images simultaneously or alternately with the display of variable light images by the means herein described. One form of auxiliary projection mechanism such as may be adapted for use in connection with the present structure and capable of being controlled by the arrangement of solenoids 91, 95 and lamp 96 as above set forth is shown and described in my copending application Serial No. 734,728, filed July 12, 1934.

In the operation of the structure herein described the electric motor 5 may be continually operated by current from the line source 85, 86, to drive the upright shaft 19 and thus impart rotation to the shafts 24 and 30, whereby the light transmission member 25 is caused to rotate across the path of reflected light rays from the light sources 14 and 15. The countershaft 31 is driven from the shaft 30, through gears 33 and 34 to rotate the cams 35 and 36 for alternately making and breaking the circuits through the lamps 14 and 15 and solenoids 91 and 95 and lamp 96. The effective cam surfaces 35 and 36 may each extend slightly more than 180 degrees whereby there is no interruption in the display, but one display image may merge into the other as the change is effected. If desired, the effective cam surfaces 35 and 36 may be so proportioned as to render either one or the other of the display mechanism effective for a longer or shorter period as will be readily understood. When the lamps 14 and 15 are lighted, reflected light rays therefrom will be passed through the moving light transmission member 25 and projection tubes 57 to be thrown into superposed relation upon a receiving surface 70 after the manner indicated above.

That part of the mechanism designated generally as a light transmission member may consist of various parts or sections, maintained in position relative to each other by the collars 22 and 23, each of said sections being formed of a light transmitting medium and said sections each possessing light transmitting qualities or characteristics similar to or differing from those possessed by other parts or sections thereof, whereby various changing designs or colors may be imparted to light images formed upon the receiving surface by the movement of portions of the light transmitting media across the paths of reflected light rays in such a manner as to cause the formation of a composite light image through superposing the reflected light rays from different light transmitting media upon a light receiving surface.

According to one form of my invention, as shown in Fig. 7, the light transmitting member 25 may consist of a plurality of diametrically opposed sectors 100, 101, 102, 103, 104 and 105 secured in position by means of the collars 22 and 23. Diametrically opposed sectors may be formed of any suitable light transmitting media and provided with any suitable form of contrasting design and/or color characteristics so that a composite image formed by superposing reflected light rays passed through such opposed sections will present a composite image or design upon the light receiving surface which may change with movement of either set of the opposed sectors, such as 102 and 105, and be further changed by the use of other and different contrasting design and color characteristics carried by the other sets of diametrically opposed sectors, such as 100, 103 and 101, 104. The different color and/or design characteristics of the light transmitting media of any two diametrically opposed sectors, such as 102 and 105, when the light rays pass therethrough are superposed upon the light receiving surface, as 70, to present a composite color or design image or combined color and design image possessing characteristics imparted to the reflected light rays by the light transmitting media of the opposed sectors, whereby different design or color effects may be merged to form a colored or uncolored design which is a composite of the designs formed upon the separate sectors. Since a similar arrangement of contrasting designs may be carried by the sectors 100, 103 and 101, 104, which may also vary from those carried by 102—105, the continued rotation of the light transmitting member 25 across the path of light rays will result in the presentation of constantly changing images caused by the superposing of light rays passed through various different light transmitting media containing or embodying different design and/or color characteristics, and different from each other throughout the extent of the light transmitting member 25.

It will be understood that any desired number of opposed sectors may be employed to make up the light transmitting member 25 and the design and/or color characteristics of the opposed and successive sectors may differ from or correspond with each other in accordance with a predetermined plan for obtaining any desired arrangement of blending or contrasting design and/or color characteristics.

In another form which my invention may assume in practice, as shown in Fig. 8 of the drawings, substantially one-half of the light transmitting member 25 constitutes a sector 108 which is made up of a light transmitting medium possessing uniform design and/or color characteristics throughout its extent as indicated by the design 109. The sectors 110, 111 and 112 located in opposition to the sector 108 may be provided with designs 113, 114 and 115 respectively, differing from the design carried by the sector 108, whereby the composite image produced by the superposing of reflected light rays passed through the sector 108 in combination with reflected light rays alternately passed through sectors 110, 111, 112 will provide a composite image which combines the color and/or design characteristics 113, 114 and 115 with the design and/or color characteristics 109 of the sector 108. By means of such an arrangement of light transmitting media a single basic color or design characteristic may be employed with and modified by its combination with two or more secondary design or color characteristics to produce constantly changing images upon light reflecting surfaces each of which may possess a basic characteristic modified by two or more secondary characteristics to form a constantly changing design.

In employing the plane mirrors 66 within the projection tubes 57 the transmitted design characteristics may be further modified by reason of the multiple reflections of image effects constantly produced by the mirror 66.

While I have shown two forms of light transmitting members having sectors made up of light transmitting media which may possess different light and/or color characteristics, that is, capable of transmitting light rays to form images of different color or design on a light receiving surface, various other arrangements of parts may be employed for the purpose, and the light transmitting means may differ as desired in shape and arrangement of parts from that shown to provide light transmitting media of corresponding or contrasting color and/or design characteristics movable across the paths of reflected light rays from each light source without departing from the spirit and scope of my invention. In any case, the modification of transmitted light rays with respect to their color, design and/or light characteristics produce changing design, light and/or color characteristics in the formed image which may be caused to merge to produce a composite image of substantially regular character or a constantly changing effect, and the employment of different light media successively may produce a continually changing effect in the display. The light transmitting media employed in connection with the different light sources at one time may differ from each other either in color or in design, or in both, which differences may combine to produce a regularly or irregularly changing image when light rays pass therethrough are superposed upon a light receiving surface.

While I have shown and described solenoids 91 and 95 and lamp 96 as controlled through the cam 36 by the interrupter 40 for controlling the operating parts of an auxiliary projection device directly from the shaft 31, such auxiliary projection device may be dispensed with if desired, or incorporated into the present structure, or controlled by independent means, as may be found desirable in practice.

What I claim is:—

1. A light projection display means comprising spaced light sources, means for reflecting light rays from each light source, means for variably modifying the reflected light rays from one light source in accordance with a predetermined plan, means for uniformly modifying the reflected light rays from the other light source during the period of variable modification of the light rays from the first light source, means for reversing the manner of modifying the reflected light rays from the said light sources at intervals and means for projecting the reflected light rays from said light sources into superposed relation upon a light receiving surface.

2. In a light projection display mechanism, spaced light sources, means for reflecting light rays from said spaced light sources along separate paths, combined color and design modifying light transmitting means having portions differing from each other in color and design effect but each of uniform color and design effect throughout its extent movable simultaneously across the paths of the light rays from said light sources, and means for projecting the modified light rays from said separate light sources after passage through said light transmitting means into superposed relation upon a light receiving surface.

3. In a light projection display mechanism, spaced light sources, means for reflecting light rays from said spaced light sources along separate paths, design modifying light transmitting means discontinuously variable throughout for imparting periodically changing design characteristics to transmitted light rays passed therethrough independently of the light density due to color variations in said transmitting means, said transmitting means being movable across the path of the light rays from said light sources continuously, and means for projecting the modified light rays from said separate light sources after passage through said light transmitting means into superposed relation upon a light receiving surface.

4. A device for producing a superposed light effect comprising in combination a pair of lights, a reflector for each light, a single rotatable color and design producer, said producer consisting of pairs of diametrically opposed differently colored transparent sectors having upon them the desired designs, one of each pair of sectors in its rotation transmitting alternately one of the reflected beams, and means bringing to a common point upon a screen the separately transmitted beams.

ERNEST NANFELDT.